US 6,644,725 B2

(12) United States Patent
Braitmaier et al.

(10) Patent No.: US 6,644,725 B2
(45) Date of Patent: Nov. 11, 2003

(54) BODY PILLAR FOR A MOTOR VEHICLE

(75) Inventors: Klaus Braitmaier, Herrenberg (DE); Roland Joerg, Rottenburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/264,411

(22) Filed: Oct. 4, 2002

(65) Prior Publication Data

US 2003/0075954 A1 Apr. 24, 2003

(30) Foreign Application Priority Data

Oct. 11, 2001 (DE) .......................... 101 49 988

(51) Int. Cl.[7] ................................ B60J 10/08
(52) U.S. Cl. .................. 296/203.03; 296/205; 296/188
(58) Field of Search .................... 296/205, 203.03, 296/30, 188

(56) References Cited

U.S. PATENT DOCUMENTS 5,048,887 A * 9/1991 Kunishima et al. ...... 296/146.9
5,228,741 A * 7/1993 Ide ........................ 296/188
5,941,597 A * 8/1999 Horiuchi et al. ....... 296/203.01
6,340,203 B2 * 1/2002 Enomoto et al. ...... 296/203.02
6,378,933 B1 * 4/2002 Schoen et al. ............ 296/188
6,447,052 B2 * 9/2002 Saeki ...................... 296/188

FOREIGN PATENT DOCUMENTS

DE 4016730 * 5/1990

* cited by examiner

Primary Examiner—Joseph D. Pape
(74) Attorney, Agent, or Firm—Kenyon & Kenyon

(57) ABSTRACT

In a body pillar for a motor vehicle, which is put together from a plurality of profiled shells to form a hollow pillar which includes a wall pillar section and a roof pillar section angled with respect thereto, a reinforcing tube being fastened within the hollow pillar, the tube extending in the longitudinal direction of the roof pillar section into the wall pillar section. The reinforcing tube is supported in the transition region between the roof pillar and wall pillar section by an end of a strut which extends in the vertical direction of the wall pillar section and encloses a supporting angle with the reinforcing tube.

10 Claims, 2 Drawing Sheets

BODY PILLAR FOR A MOTOR VEHICLE

CROSS-REFERENCE TO RELATED APPLICATIONS

The present application claims priority to Application No. 101 49 988.4, filed in the Federal Republic of Germany on Oct. 11, 2001, which is expressly incorporated herein in its entirety by reference thereto.

FIELD OF THE INVENTION

The present invention relates to a body pillar for a motor vehicle.

BACKGROUND INFORMATION

An A-pillar for an open motor vehicle is known from Mercedes-Benz type SL (R129), the A-pillar being put together from an inner and an outer profiled shell to form a hollow pillar. In this case, the A-pillar includes a wall pillar section and a roof pillar section angled with respect thereto, a reinforcing tube, which extends in the longitudinal direction of the roof pillar section into the wall pillar section, being fastened within the hollow pillar in order to avoid buckling of the roof pillar section if the motor vehicle overturns.

It is an object of the present invention to provide a body pillar for a motor vehicle, in which buckling of the roof pillar section if the motor vehicle overturns may be reliably avoided.

SUMMARY

The above and other beneficial objects of the present invention are achieved by providing a body pillar for a motor vehicle as described herein.

In the case of the motor vehicle according to the present invention, the reinforcing tube is additionally supported in the angled transition region between the roof pillar section and wall pillar section by an end of a strut, as a result of which if overturning occurs, buckling, in particular at the lower end of the roof pillar section, may be particularly reliably avoided. Since the strut extends in the vertical direction of the roof pillar section, it may be particularly well-suited for absorbing an upwardly acting impact force if the motor vehicle overturns.

A particularly good bond between the reinforcing tube and strut may be provided by a reinforcement which is used to connect the two profiles to each other. In this arrangement, two reinforcing shells whose ends are connected in a form-fitting manner to the circumference of the associated tube may be provided. This structural unit may be pre-assembled in a simple manner and may then be fastened to the profiled shells before the latter are put together to form the hollow pillar.

The strut may be fastened with its one end particularly far up in a central region of the reinforcing tube if the strut extends in a slightly curved manner between approximately rectilinear end regions. The curvature of the strut is provided in the region of overlap with the reinforcement in order to increase the stability of the strut in this region.

The reinforcing tube and the strut may be produced in each case from a high-strength steel tube, the reinforcing tube, the strut and the reinforcement forming, e.g., a triangular framework. If the motor vehicle overturns, these measures may have the effect of achieving a smaller deformation of the pillar, a homogeneous pattern of deformation of the pillar without buckling and a dynamic restoration of the pillar as the load slackens.

Further aspects, features and details of the present invention are described below with reference to an exemplary embodiment and with reference to the drawing.

DETAILED DESCRIPTION

Figure 1:
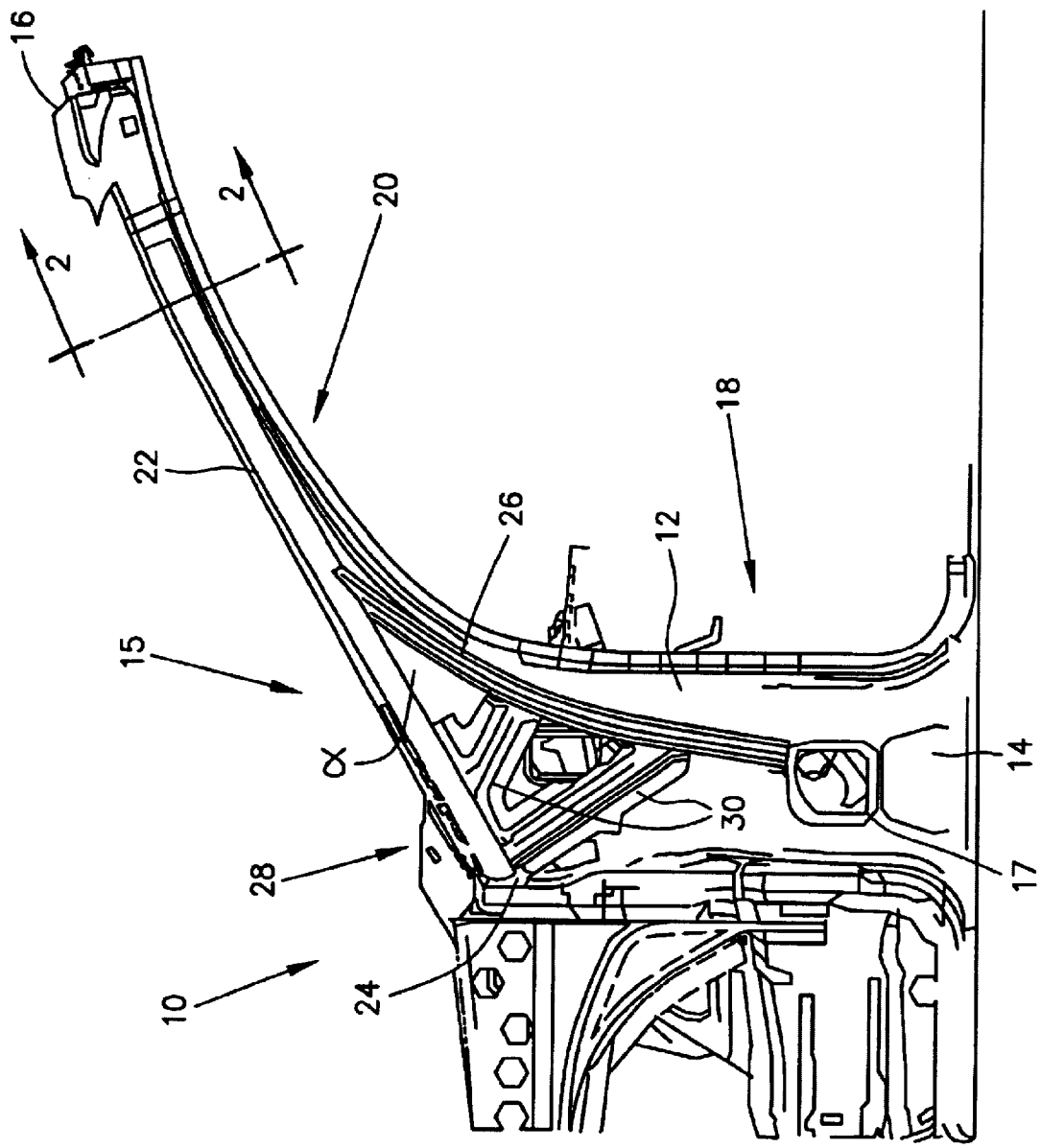
FIG. 1 is a schematic side view of an inner side wall shell of an open motor vehicle with an inner profiled shell of an A-pillar in whose cavity a reinforcing tube supported by a strut is arranged.
Figure 2:
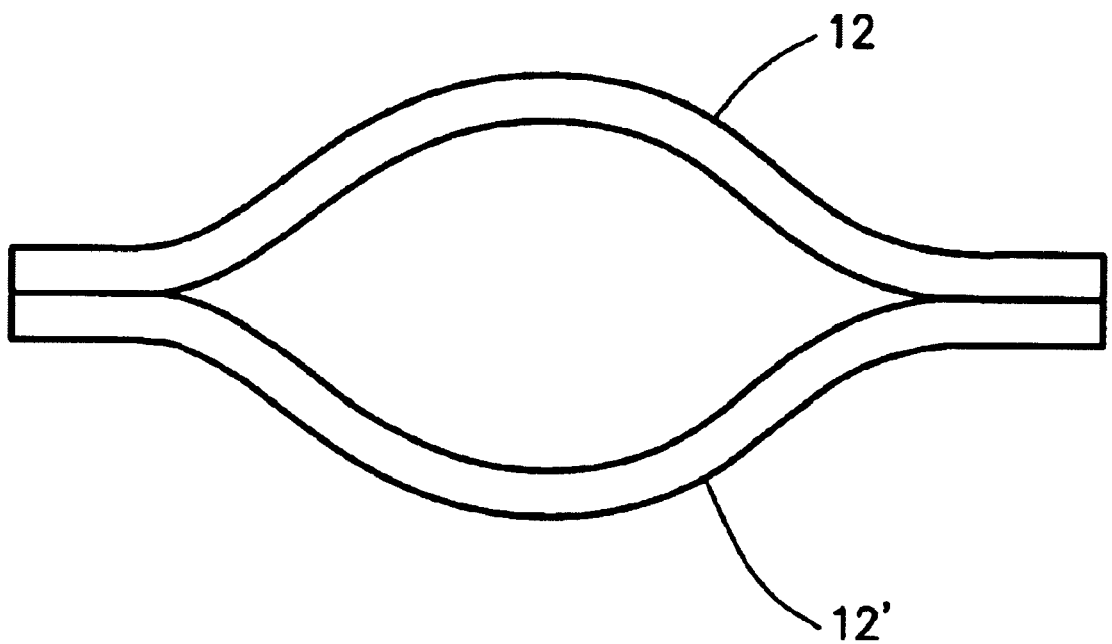
FIG. 2 is a transverse cross-sectional view of the A-pillar taken along lines 2—2 in FIG. 1.

In the Figure, an inner side wall shell 10 of an open motor vehicle, for example a roadster or a cabriolet, from approximately a front wheel arch as far as approximately the center of the vehicle is illustrated in a schematic side view. The inner side wall shell 10 is assigned the inner profiled shell 12 of an A-pillar. By an outer profiled shell of the A-pillar, which shell is assigned to an outer side wall shell 12' as seen in FIG. 2, the A-pillar may be put together to form a hollow pillar 15. FIG. 2 is a transverse cross section of the A-pillar taken along lines 2—2 in FIG. 1. The A-pillar extends from a pillar base 14 in the region of the floor of the vehicle as far as an upper cross member 16 of the windscreen frame. The hollow pillar 15 includes a wall pillar section 18 extending from the pillar base 14 to approximately level with the tailgate upper edge and a roof pillar section 20 which is angled with respect thereto and extends from the tailgate upper edge to level with the roof upper side. Fastened within the hollow pillar 15 is a reinforcing tube 22 (not shown in FIG. 2 for clarity purposes) which extends in the longitudinal direction of the roof pillar section 20 into the wall pillar section 18 and ends at, or is supported on, a front wall 24 of the wall pillar section 18. In the transition region between the roof pillar section 20 and wall pillar section 18 of the hollow pillar 15, the reinforcing tube 22 is supported by one end of a strut 26 which extends in the vertical direction of the wall pillar section 18 and encloses a supporting angle $\alpha$ with the reinforcing tube 22. The supporting angle $\alpha$ is approximately 30° here and, depending on the manner of construction, may vary, e.g., between 15° and 80°. At its lower end, the strut 26 extends into the pillar base 14 and is supported on a console 17, a cross member, etc. Both the reinforcing tube 22 and the strut 26 have an annular cross section although oval or polygonal cross sections may also be possible. In order, if the motor vehicle overturns, to achieve a smaller deformation of the hollow pillar 15, a homogeneous pattern of deformation without buckling and a dynamic restoration of the pillar 15 as the load slackens, the reinforcing tube 22 and the strut 26 are each produced from a high-strength steel tube. The end of the strut 26 is fastened approximately in the center of the reinforcing tube 22. For this purpose, the strut 26 has a slight curvature between the approximately rectilinear end regions in the transition region between the roof pillar section 20 and wall pillar section 18. A reinforcement in the form of two reinforcing shells 30 made of sheet metal is provided between the curvature of the strut 26 and the front end of the reinforcing tube 22, the reinforcing shells being fastened on the outside of the tubes 22, 26 and only the inner reinforcing shell 30 thereof being illustrated. The reinforcing tube 22, the strut 26 and the reinforcement 28 form a triangular framework. In order to achieve an extremely stiff bond between reinforcing tube 22 and strut 26, the ends of the reinforcing shells 30 are connected in a form-fitting manner to the circumference of the respectively associated tube 22, 26. The strut 26, the reinforcing tube 22 and the reinforcement 28 are welded to one another to form a pre-assembled structural unit which is then fastened to the profiled shells 12 of the hollow pillar 15, for example by welding connections, etc.

The reinforcement of the A-pillar may also be used in the case of a rear roof pillar, for example the C-pillar. Another effect achieved by the reinforcement is that at least some of the reinforcing measures of the hollow pillar in the region of the hinges of the vehicle door may be omitted.

What is claimed is:

1. A body pillar for a motor vehicle, comprising:
   a plurality of profiled shells configured to form a hollow pillar, including a wall pillar section and a roof pillar section, the roof pillar section angled with respect to the wall pillar section;
   a reinforcing tube fastened within the hollow pillar and extending in a longitudinal direction of the roof pillar section into the wall pillar section; and
   a strut extending in a vertical direction, one end of the strut arranged to support the reinforcing tube in a transition region between the roof pillar section and the wall pillar section, the strut arranged to enclose a supporting angle with the reinforcing tube.

2. The body pillar according to claim 1, further comprising a reinforcement, the reinforcing tube and the strut connected to each other in the transition region between the roof pillar section and the wall pillar section by the reinforcement.

3. The body pillar according to claim 2, wherein the reinforcement includes two reinforcing shells having ends connected form-fittingly to a circumference of an associated one of the reinforcing tube and the strut.

4. The body pillar according to claim 2, wherein a pre-assembled structural unit includes the strut, the reinforcing tube and the reinforcement connected to each other.

5. The body pillar according to claim 1, wherein the strut extends slightly curved between approximately rectilinear end regions.

6. The body pillar according to claim 2, wherein the strut is curved in a region of overlap with the reinforcement.

7. The body pillar according to claim 1, wherein the body pillar is configured as an A-pillar of an open motor vehicle.

8. The body pillar according to claim 1, wherein each of the reinforcing tube and the strut are formed of high-strength steel tube.

9. The body pillar according to claim 2, wherein the reinforcing tube, the strut and the reinforcement form a triangular framework.

10. The body pillar according to claim 1, wherein the reinforcing tube extends as far as a front wall of the wall pillar section and the strut extends into a region of a pillar base of the body pillar.

* * * * *

UNITED STATES PATENT AND TRADEMARK OFFICE
CERTIFICATE OF CORRECTION

PATENT NO. : 6,644,725 B2
DATED : November 11, 2003
INVENTOR(S) : Braitmaier et al.

It is certified that error appears in the above-identified patent and that said Letters Patent is hereby corrected as shown below:

Column 2,
Line 26, after "transverse" change "cross section" to -- cross sectional view --.

Signed and Sealed this

Tenth Day of August, 2004

JON W. DUDAS
*Acting Director of the United States Patent and Trademark Office*